June 22, 1926.

E. O. PEALER

FISH LURE

Filed July 21, 1925

1,589,860

Inventor
Elias O. Pealer
By Dowell & Dowell
his Attorneys

Patented June 22, 1926.

1,589,860

UNITED STATES PATENT OFFICE.

ELIAS OLIVER PEALER, OF UTICA, NEW YORK, ASSIGNOR OF ONE-HALF TO MARGARET PERISI, OF UTICA, NEW YORK.

FISH LURE.

Application filed July 21, 1925. Serial No. 45,100.

This invention relates to a class of devices known in the art as fishing or trolling spoons, and has for its object to provide a simple and inexpensive device of the character referred to that will give the appearance of a live or crippled minnow, when it is drawn through the water, and serve as an effective lure to fish near the path of movement of the trailing device.

The invention will first be hereinafter more particularly described, with reference to the accompanying drawings, which are to be taken as a part of this specification, and then pointed out in the claims at the end of the description.

In said drawings, Fig. 1 is a bottom plan view of a trolling spoon or lure embodying my invention;

Figure 1:
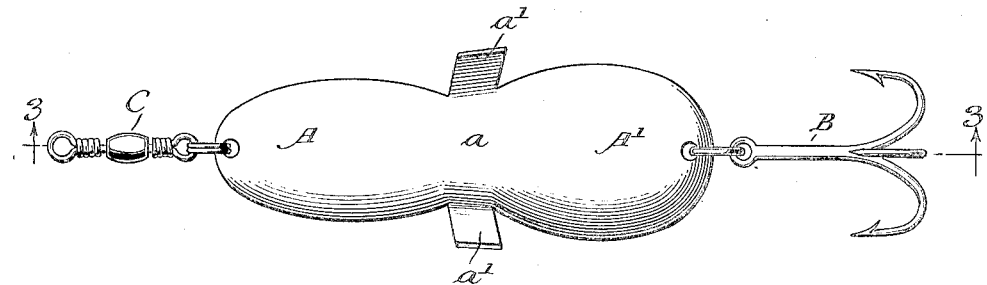
Figure 2:
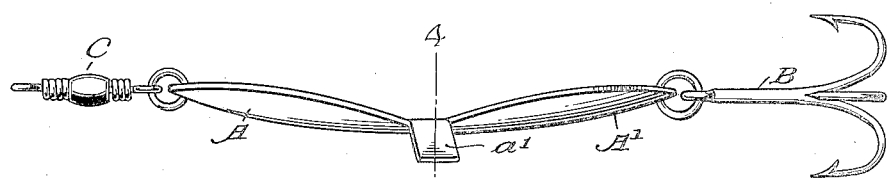
Fig. 2 is a side elevation of the same; showing the parts in the position they assume when drawn through the water.
Figure 3:
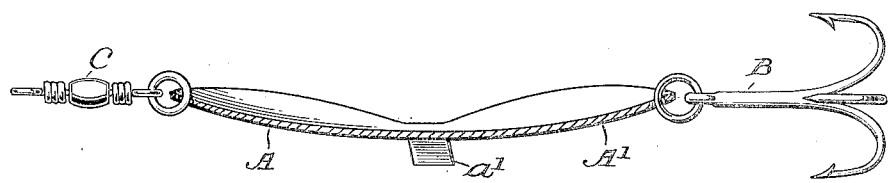
Fig. 3 is a longitudinal sectional view of the spoon, showing the attached hook and swivel in side elevation.
Figure 4:
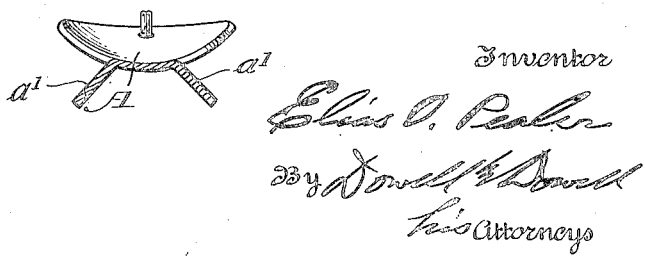
Fig. 4 is a detail transverse section taken on the line 4—4 of Fig. 2.

Referring to said drawings, in which the same reference letters are used to denote corresponding parts in different views, the spoon consists essentially of an oblong body of sheet metal, or other suitable material, having front and rear portions A and $A^1$ each of concavo-convex or spoon-shaped form and converging toward and merging in an intermediate portion $a$ of reduced width from opposite sides of which project outwardly and downwardly inclined wings $a^1$, which are preferably flat and of substantially rectangular form, representing the fins of a minnow, and adapted to prevent the device from turning over or revolving as it is trailed through the water, giving a lifelike appearance, which is so desirable and effective in luring a fish. The rear spoon-shaped portion of the device is preferably wider than its front portion for greater efficiency in producing the desired result, though both front and rear portions may be of the same width; the intermediate connecting portion being of less width in either case. Each part A and $A^1$ of the oblong body is provided at its free end with a hole to receive a split ring or other means for attaching thereto at the rear a hook B, and at the front a swivel C, to which may be attached a line for trailing the device in a well known manner.

In operation, as the article is drawn through the water, with the attached hook trailing behind and acting as a rudder, the front spoon-shaped portion has a tendency to dip under the water but this is neutralized or counteracted by the pressure or resistance of the water forced against the upper surface of the rear spoon-shaped portion, and owing to the peculiar construction of the device with side wings resembling the fins of a fish it will wiggle and dart about through the water without turning over or revolving, thus producing a vivid life-like appearance simulating a minnow darting through the water, which is very effective in luring a fish.

It will be understood of course that the article may be constructed in different sizes and of different materials, though sheet metal is preferable, either aluminum, brass, copper, or nickel-plate, finished in various colors, as desired, and it may be possible to vary some of the details without materially affecting the efficiency of the device or departing from the spirit and scope of my invention, though the peculiar form shown has proven to be very effective in practical use, and from experience in using somewhat similar devices as heretofore constructed the construction shown is believed to be best adapted to produce the desired result. I therefore do not desire to be limited in the appended claims to the specific form shown and I also desire it to be understood that the word "metal" as used in said claims is intended to include any suitable material.

Having thus described my invention, what I claim as new and desire to secure by Letters Patent of the United States is:

1. A fishing spoon comprising an oblong metal body having front and rear portions of spoon-shaped form converging toward and merging into an intermediate portion of reduced width having laterally projecting wings or fins.

2. A fishing spoon comprising an oblong metal body having front and rear portions of spoon-shaped form converging toward and merging into an intermediate portion of reduced width having laterally projecting downwardly inclined wings or fins; said body being slightly curved from end to end thereof so that said spoon-shaped portions extend upwardly in opposite directions from said intermediate portion.

3. A fishing spoon comprising an oblong metal body having front and rear portions of spoon-shaped form converging toward and merging into an intermediate connecting portion of reduced width arranged slightly below the plane of said spoon-shaped portions, w'ich extend upwardly therefrom in opposite directions; said intermediate portion having laterally projecting wings or fins which extend downwardly at an oblique angle to said body.

4. A fishing spoon comprising an oblong metal body having front and rear portions cf spoon-shaped form converging toward and merging into an intermediate connecting portion of reduced width having integral laterally projecting downwardly inclined wings or fins; said rear portion being wider than said front portion.

5. A fishing spoon comprising an oblong metal body having front and rear portions of spoon-shaped form converging toward and merging into an intermediate connecting portion of reduced width having integral projecting downwardly inclined wings or fins; said rear portion being wider than said front portion, and said body being slightly curved from end to end thereof so that said intermediate portion is arranged slightly below the plane of said spoon-shaped portions.

6. A fishing spoon comprising an oblong metal plate having front and rear portions of spoon-shaped form converging toward and merging into an intermediate portion of reduced width having laterally projecting downwardly inclined wings or fins; said rear portion being wider than said front portion and said body being slightly curved from end to end thereof so that said intermediate portion is arranged slightly below the plane of said front and rear portions.

In testimony whereof I affix my signature.

ELIAS OLIVER PEALER.